Dec. 29, 1931.   R. E. KOHR   1,838,313
HOSE COUPLING
Filed April 24, 1930

Inventor
Robert E. Kohr
by J. Stuart Freeman
Attorney

Patented Dec. 29, 1931

1,838,313

UNITED STATES PATENT OFFICE

ROBERT E. KOHR, OF STONEHURST, UPPER DARBY, PENNSYLVANIA

HOSE COUPLING

Application filed April 24, 1930. Serial No. 446,805.

The object of the invention broadly is to provide improvements in couplings for any articles which may be joined together in two or more sections to form a more continuous unit, such for instance as tubes, pipes, rods, bars, and the like, but more especially for the purpose of uniting in an air-tight union suction and discharge hose, used in conducting various fluids, including the type employed to conduct water in fire-fighting apparatus, and in the proper connection of sections of such hose to nozzles, reducers, adapters and bases, and in connecting these last-mentioned articles to one another as in the uniting of interchangeable tips with a given nozzle.

Another object is to provide a coupling which is manually operable to at least a large degree, even though it may be desired, upon occasion, to employ a wrench to further tighten the same, for which purpose wrench-engaging means are provided. The construction of the invention however provides for means whereby the frictional engagement of one coupling member with the other in a joint is materially increased without resorting to ratchets which have to be released before separation of two coupling members can be obtained after having been once operatively engaged.

A further object therefore has been to provide upon one member a circumferentially arranged series of depressions into which a ball or similar element is adapted to move in order to resist accidental loosening and possible separation of the members, but which can be released manually substantially as easily as it is originally operated in the original connection of the device, it being understood that instead of depressions to receive a ball or the like, ridges or other forms of irregularities may be provided with which a suitable element may cooperate for the accomplishment of the same purpose as the ball and depression combination referred to.

Still another object is to provide in such a device a pair of depression or ridge series, the depth or height of which increases in opposite directions, so that the spring or similar pressure upon the ball or equivalent element assists in the operation of manually uniting the members in operative relation.

Figure 1:
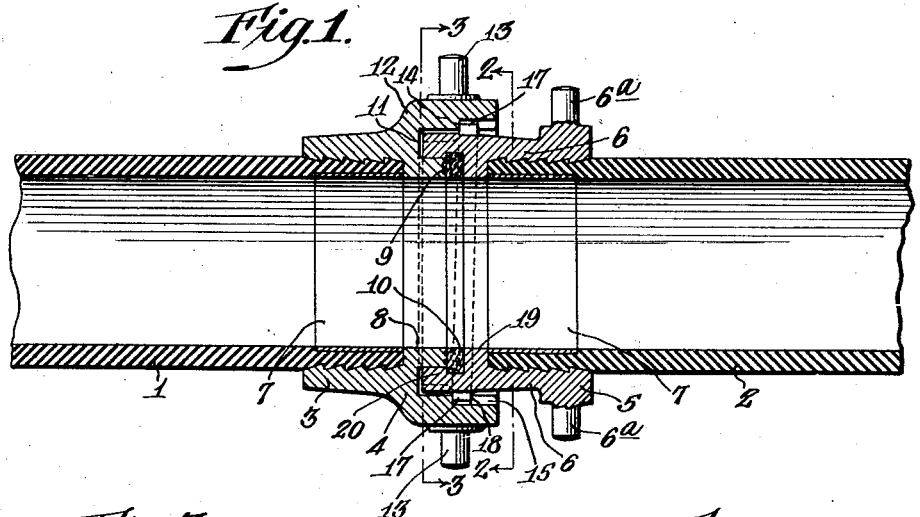
Figure 3:
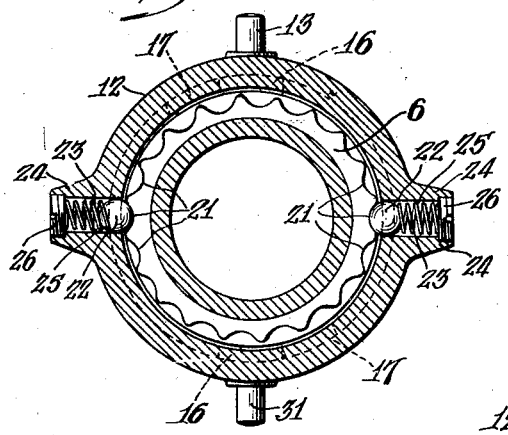
Figure 2:
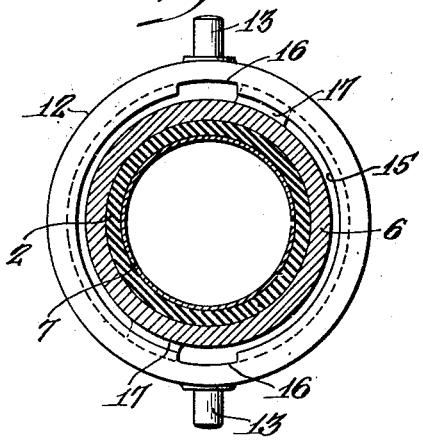
Figure 4:
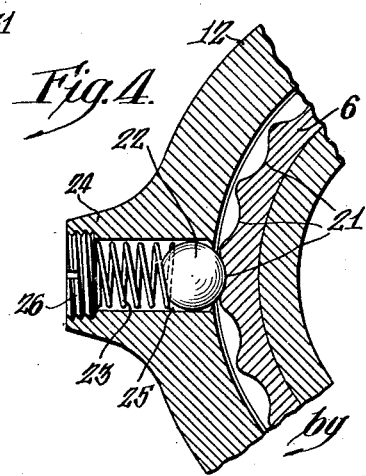

With these and other objects in mind, the present invention comprises further details of construction and operation which are fully brought out in the following description, when read in conjunction with the accompanying drawings, in which Fig. 1 is a longitudinal diametrical section of the adjacent end portions of two hose sections united by means of a coupling which comprises one embodiment of the invention; Fig. 2 is a section on the line 2—2 of Fig. 1; Fig. 3 is a similar section on the line 3—3 of Fig. 1; and Fig. 4 is an enlarged fragmentary section of the left-hand portion of the device as illustrated in Fig. 3.

Referring to the drawings, it is to be understood that each section of hose, as representative of the many articles which may be connected by means of this improved coupling, is provided upon one end with one of the coupling members illustrated and upon its opposite end with the other of such members. Therefore, the adjacent ends 1 and 2 of two sections of hose, or the opposite ends of the same section, are shown in operative alignment in Fig. 1.

The free end portion of the section 1 enters the internally grooved free end portion 3 of a cylindrical member 4, while the adjacent end portion of the hose section 2 enters the similarly grooved end portion 5 of a second cylindrical member 6, said hose sections being secured within and in fluid-tight engagement with said coupling members by means of expansion rings 7.

The first of said members 4 is provided with a bore 8 which is a continuation of the internal diameter of the hose section 1 and adjacent ring 7, said bore terminating in a shoulder which is preferably provided with alternate ridges and grooves 9 for the better engagement of a relatively soft annular washer 10. Radially outwardly beyond this corrugated surface said member 4 is provided with an annular groove 11, and in turn radially outwardly beyond this groove there is an integral over-hanging flange 12, provided upon its outer surface with wrench-engaging lugs or handles 13. The inner surface of this flange is provided with a circumferential groove 14, one side of which is but partially closed by means of radially inwardly extending flange sections 15, separated at intervals 16 for the passage of lugs 17, carried by the other of said coupling members as hereinafter described. As shown in Fig. 1 the longitudinally inner surfaces 18 of said flange sections 15 are of spiral shape, but instead of being continuations one of the other, are duplicates, so that their function when engaged by the lugs 17 will be the same, thereby operating to uniformly draw said coupling members more firmly together as they are rotated in relatively opposite directions.

The second coupling member 6 is also provided with wrench-engaging lugs or handles 6ª and with a bore 19, which is a continuation of the internal diameter of the adjacent hose section 2 and adjacent ring 7, said bore terminating in a shoulder against which rests the washer 10, and which latter is secured in operative position by means of an integral overhanging flange 20. It is the radially outer surface of the member 6 that is provided with the integral lugs 17, while longitudinally beyond said lugs the outer surface of said section is provided with preferably two or more series of circumferentially extending depressions or recesses 21, into which balls 22 or equivalent elements are yieldingly forced by means of springs 23 within preferably integral housings 24, said springs being retained within said housing by means of removable plugs or the like 26. Instead of the depressions or recesses 21 being limited in longitudinal extent to the shape of a spherical segment, they are preferably of the shape of a cylindrical segment in order to provide for possible relative longitudinal variation between the balls and recesses, as the cooperating surfaces of the lugs 17 and flange sections 15 wear, or may in effect be built up by corrosion or the presence of foreign particles.

By referring to Fig. 3 in particular, it will be noted that the ball housings are preferably positioned about the outer surface of the member 4 intermediate the wrench-engaging lugs 13, while the lugs 17 and flange intervals 16 are so arranged that, when the coupling members are brought together, the balls 22 enter the oppositely positioned shallowest recesses 21. Thereafter, while the device may be arranged so as to permit relative rotation of said members in but one direction during the act of uniting them it is here illustrated as being so constructed as to permit such union to take place by only a fractional part of a rotation in either relative direction.

Thus, the radial depths of the recesses increase from the positions of the balls, as shown in Fig. 3, towards each other, so that they are of greatest depth in substantial alignment with the lugs 17. With this construction, the effective force of the springs varies as the coupling members are rotated in relatively opposite directions, and with certain sizes and shapes of recesses it has been found that the increase in their depths circumferentially away from the point of initial engagement with the balls aids in the manual connection of two hose sections thus equipped, to the extent that the use of wrenches is not necessary unless an unusually tight joint is required. To release said section after having been operatively connected, the reverse movement is all that is necessary in order to accomplish the separation, as the balls move yieldingly from one recess to another without requiring that they be actually released as is the case when dogs or pawls are used. Also, if preferred for any reason, the recesses 21 may decrease in radial extent as they progress longitudinally away from the initial ball positions, but such minor details are a matter of design and clearly fall within the scope of the appended claims.

Having thus described my invention, what I claim and desire to protect by Letters Patent of the United States is:—

1. A two-member coupling, comprising a circumferentially arranged series of surface irregularities in one member, and a yieldingly positioned element carried by the other member and adapted to move in opposite direction across said irregularities.

2. A two-member coupling, comprising a circumferentially arranged series of recesses in one member, and a yieldingly positioned element carried by the other member and adapted to move in opposite direction with respect to said series and to engage within said recesses.

3. A two-member coupling, comprising a circumferentially arranged series of recesses in one member, and a spring-pressed element carried by the other member and adapted to move in opposite direction with respect to said series and to engage within said recesses, and operative to increase the interengagement of one of said members for the other.

4. A two-member coupling, comprising a circumferentially arranged series of surface irregularities in one member and varying in radial extent in opposite directions, and a yieldingly positioned element carried by the other member and adapted to engage said irregularities and move in opposite directions thereacross.

5. A two-member coupling, comprising a circumferentially arranged series of recesses in one member and their respective lowest elevations approaching the axis of said member as they progress in opposite directions from an intermediate point, and a yieldingly positioned element carried by the other member and adapted to enter said recesses and move thereacross in opposite directions as said members are operatively united or are loosened with respect to each other.

6. A two-member coupling, comprising a circumferentially arranged series of recesses in one member, a spring-pressed element carried by the other member and adapted to move in opposite directions with respect to said series and to engage within said recesses, and a housing for said element which opens only into the interior of its supporting member.

7. A two-member coupling, comprising a circumferentially arranged series of parallel recesses in one member, each recess in cross section substantially comprising a cylindrical segment, a housing carried by the other member and opening only into the interior thereof, an element having a substantially spherical exposed surface slidable within said housing and projecting therefrom, and a spring inclosed within said housing and operative to yieldingly position said element, said element normally engaging within said recesses and being movable from one to another in opposite direction.

In testimony whereof I have affixed my signature.

ROBERT E. KOHR.